Jan. 7, 1941.        A. F. POTT         2,228,035
DEVICE FOR THE APPROXIMATION OF A VALUE
Original Filed Aug. 8, 1935    12 Sheets-Sheet 1

A. F. Pott
INVENTOR

By: Glascock Downing & Seebold
ATTYS

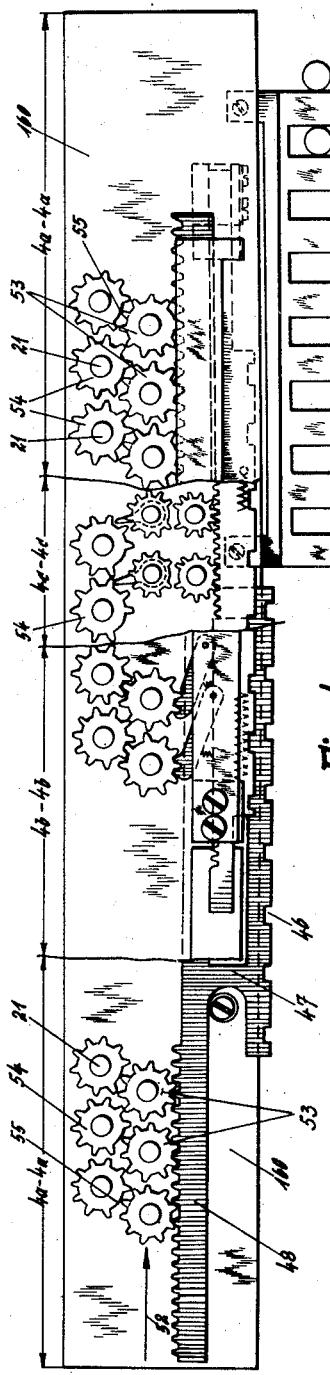

Jan. 7, 1941.  A. F. POTT  2,228,035
DEVICE FOR THE APPROXIMATION OF A VALUE
Original Filed Aug. 8, 1935  12 Sheets-Sheet 4
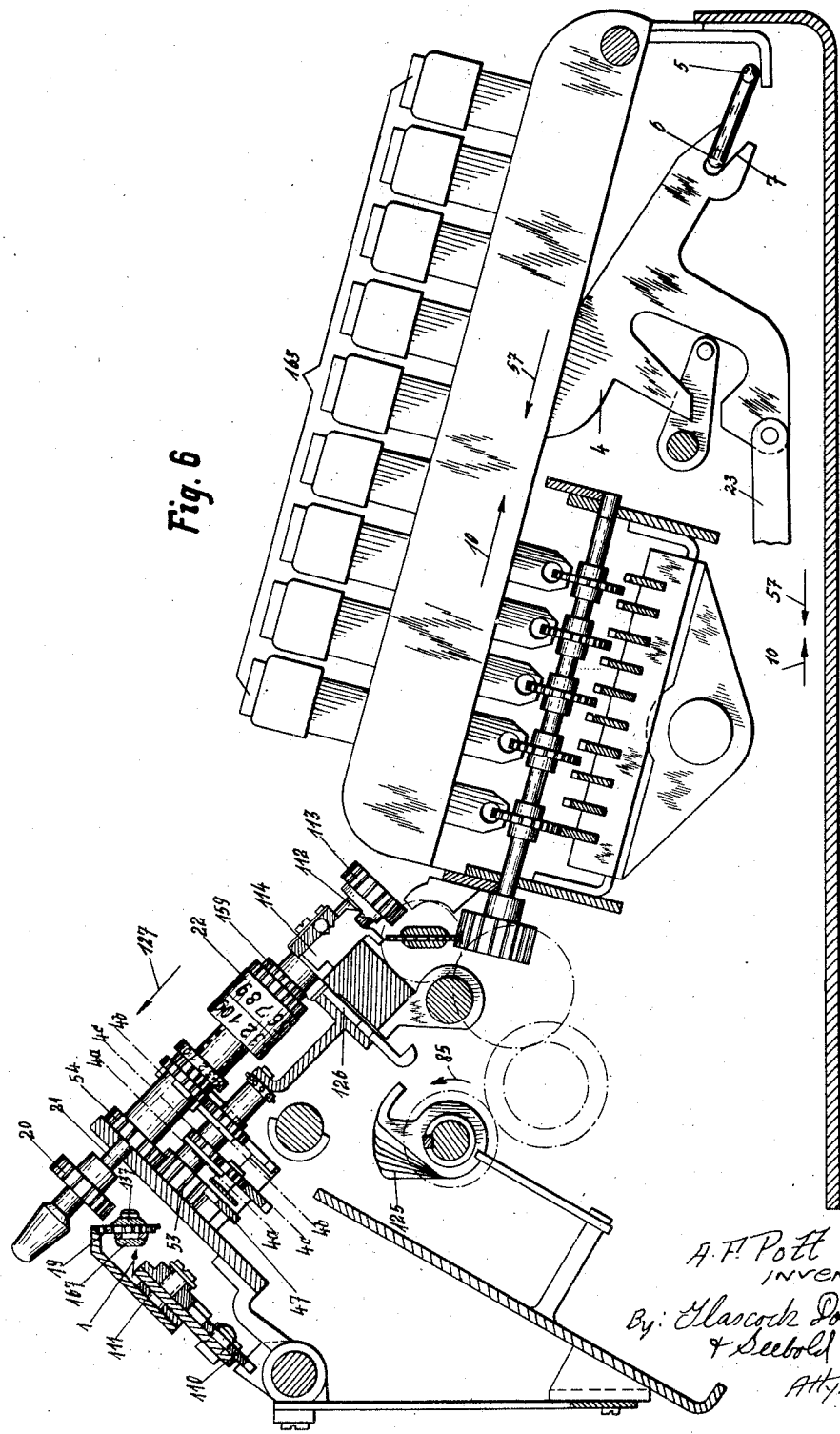

Jan. 7, 1941.  A. F. POTT  2,228,035
DEVICE FOR THE APPROXIMATION OF A VALUE
Original Filed Aug. 8, 1935  12 Sheets-Sheet 5

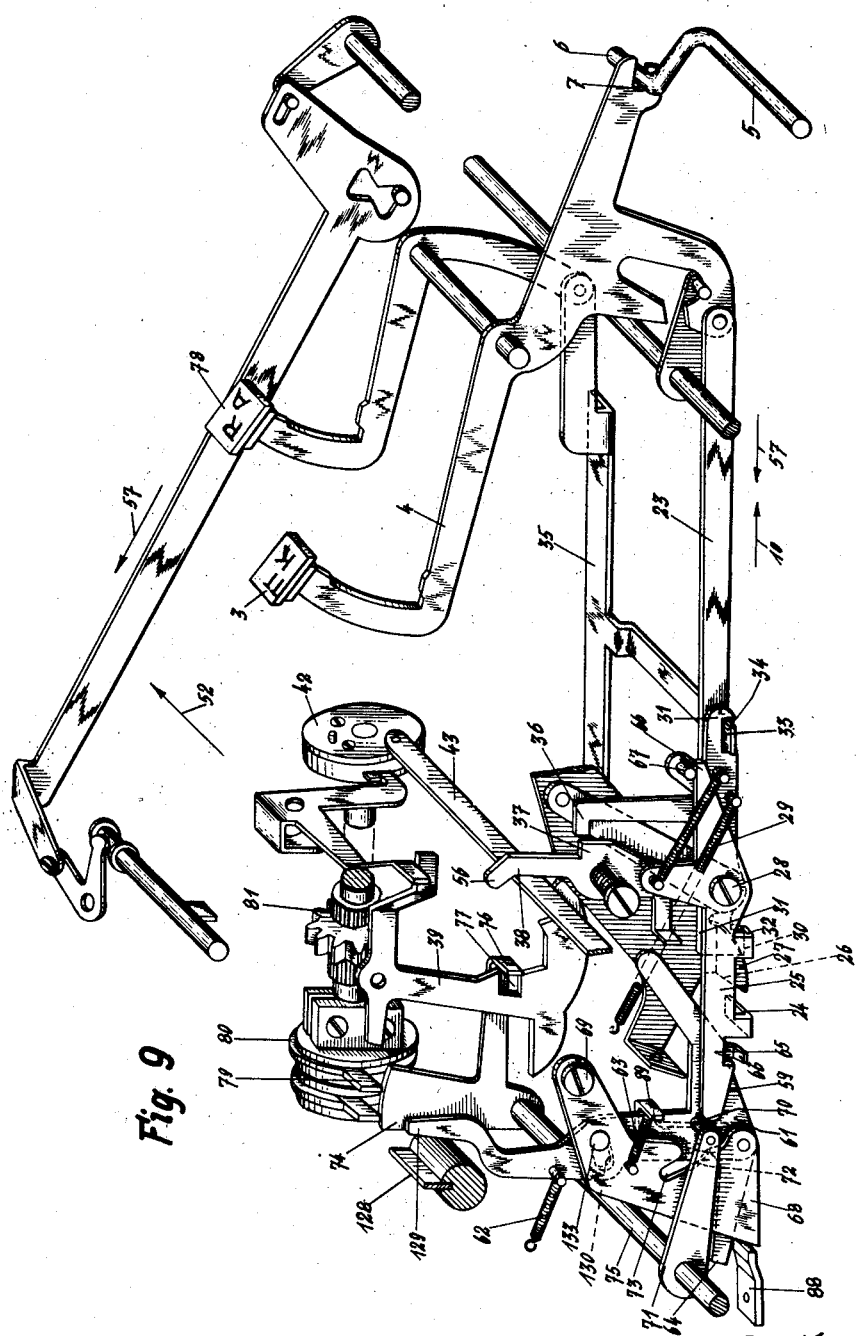

Jan. 7, 1941.  A. F. POTT  2,228,035
DEVICE FOR THE APPROXIMATION OF A VALUE
Original Filed Aug. 8, 1935  12 Sheets-Sheet 7
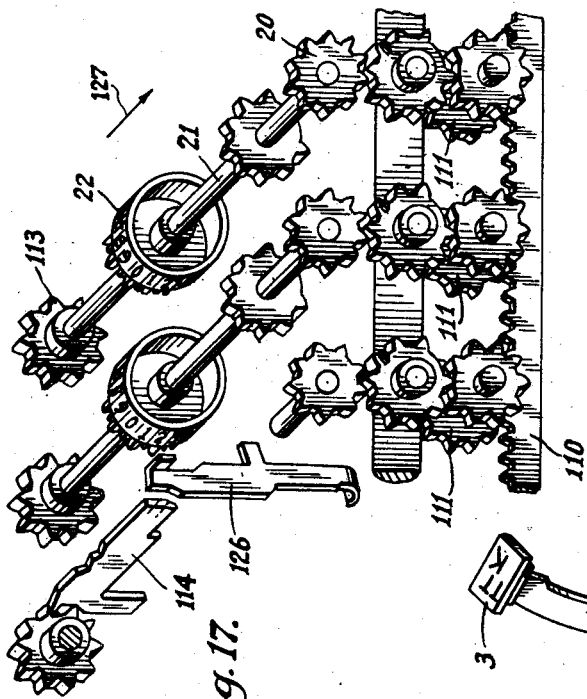
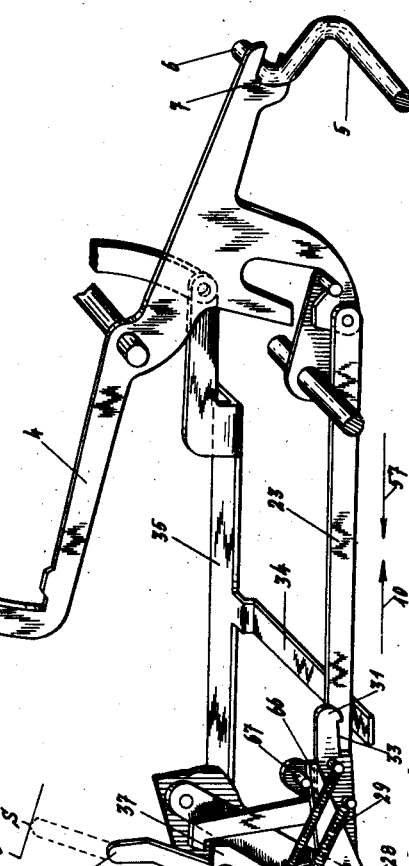
Inventor:
A. F. Pott
By: Glascock Downing & Seebold
Attys.

Jan. 7, 1941.  A. F. POTT  2,228,035
DEVICE FOR THE APPROXIMATION OF A VALUE
Original Filed Aug. 8, 1935  12 Sheets-Sheet 9

Inventor:
A. F. Pott
By Glascock Downing Seebold
Attys.

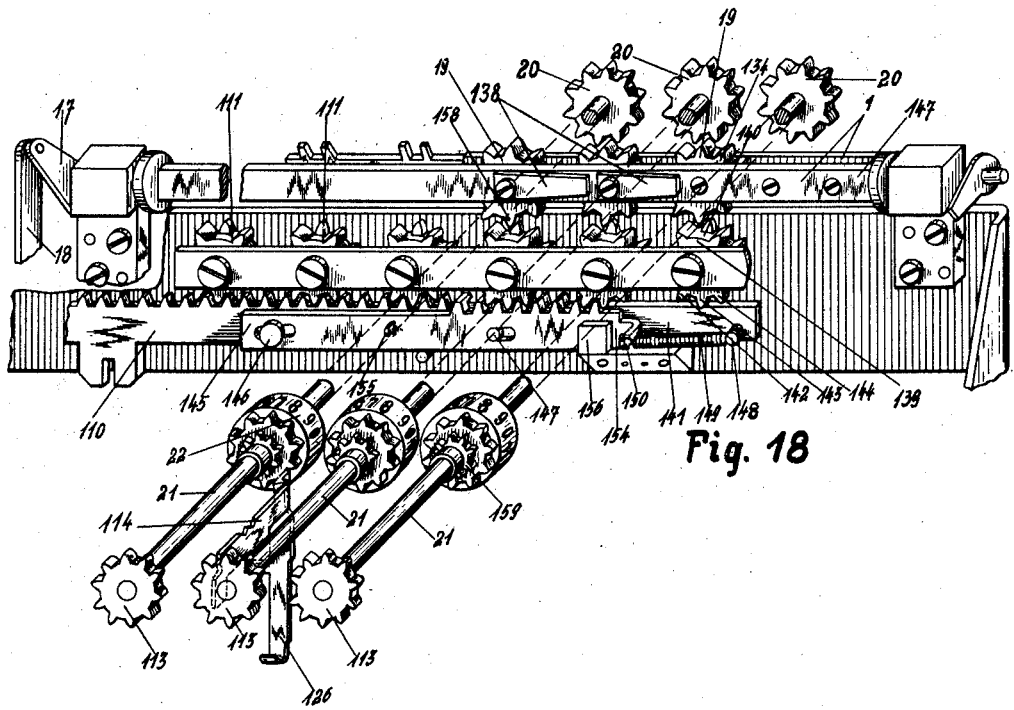

Jan. 7, 1941.    A. F. POTT    2,228,035
DEVICE FOR THE APPROXIMATION OF A VALUE
Original Filed Aug. 8, 1935    12 Sheets-Sheet 11

Inventor:
A. F. Pott
By Glascock Downing & Seebold
Attys.

Jan. 7, 1941.   A. F. POTT   2,228,035
DEVICE FOR THE APPROXIMATION OF A VALUE
Original Filed Aug. 8, 1935   12 Sheets-Sheet 12

Inventor:
A. F. Pott
By
Attys.

Patented Jan. 7, 1941

2,228,035

UNITED STATES PATENT OFFICE 2,228,035

DEVICE FOR THE APPROXIMATION OF A VALUE

August Friedrich Pott, Zella-Mehlis, Germany, assignor to Mercedes Büromaschinen-Werke Aktiengesellschaft, Zella-Mehlis, Germany Original application August 8, 1935, Serial No. 35,389. Divided and this application April 11, 1936, Serial No. 73,963. In Germany April 30, 1932

6 Claims. (Cl. 235—73)

The invention relates to a device for the approximation of a value in one denomination of an accumulator for calculating machines of the type disclosed in my copending application Ser. No. 35,389, filed Aug. 8, 1935, and of which the present application is a division. Said device comprises a gear drive and is actuated in dependence on an operation of the operating means for the resetting of an amount storing means. The gear drive automatically adds in five units to the appertaining denomination, thereby adding through the intermediary of the tens transfer means one unit to the next higher denomination, provided that the denomination, associated with said gear drive, shows already a "5" or any number greater than "5." In commercial transactions it is customary to increase the hundredths denomination, that is the second place to the right of the decimal point through one unit if in the thousandths denomination, i. e. the third place to the right of the decimal point a "5" appears or a number greater than "5." This approximation which has particular application to trading in merchandise when multiplication is to be carried out, for instance with marks and pfennigs, according to the invention is effected automatically so that an additional deliberation on the part of the operator is unnecessary.

In the drawings one form of the invention is illustrated by way of example.

Figures 1 to 17 illustrate well known mechanisms and are merely included in the specification for a better understanding of the invention proper.

Figure 1 shows an elevation in perspective of a calculating machine with which the invention by way of example is designed to be incorporated.

Figure 2 shows a view of the main drive shaft with the carriage shift clutch, the clutch for the differential actuating mechanism and the resetting clutch, viewed in the direction of the arrow 52 shown in Figure 1.

Figure 3 shows a perspective view, taken from the right hand front of the machine of the keys for the accumulator and revolution counter resetting device in which the resetting clutch for the sake of clearness is drawn out of its true position towards the right.

Figure 4 shows a longitudinal section through the carriage and along the lines 4a—4a, 4b—4b and 4c—4c in Figure 6 viewed in the direction of the arrow 127.

Figure 5 shows an elevation in perspective of a part of the amount storing means as well as the resetting device for the same and the accumulator, viewed from the front on the left hand side of the machine.

Figure 1:
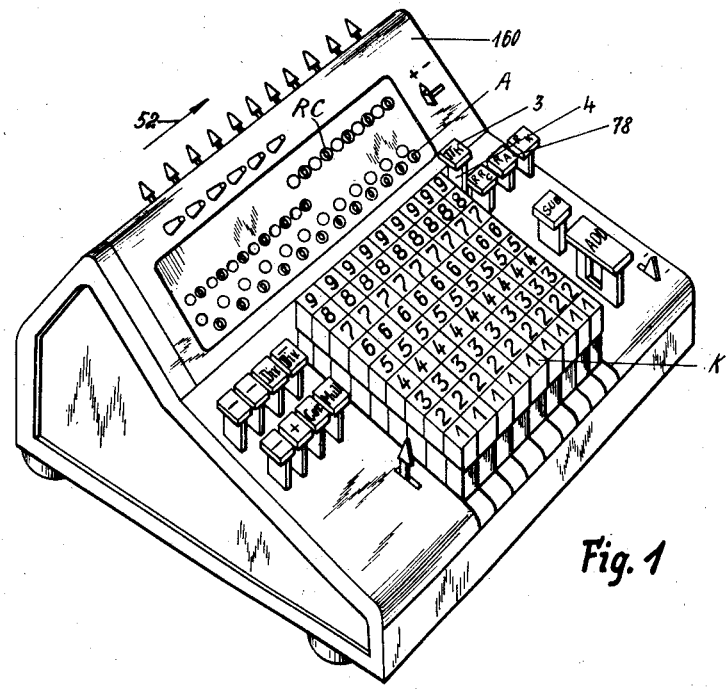

Figure 6 shows a centre section through the machine according to Fig. 1, in which various of the parts located on the left hand side for the sake of better comprehension, are represented with dotted lines and the amount storing means is represented in its inoperative position.

Figure 7:
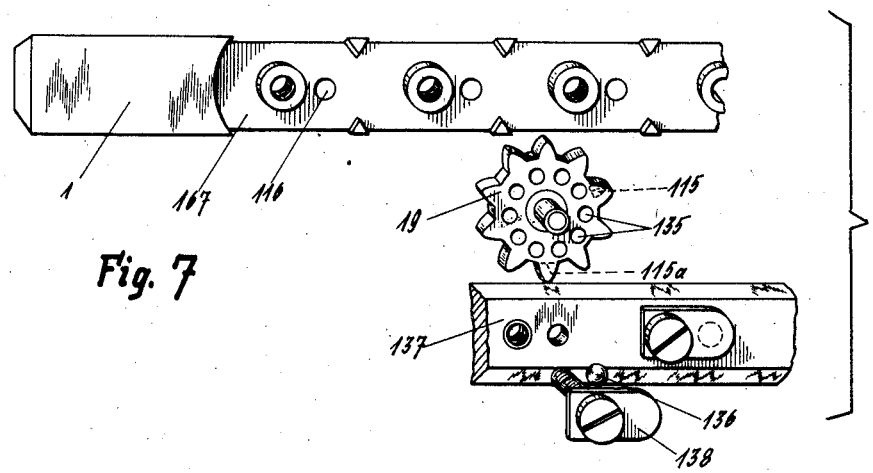

Figure 7 shows in perspective the individual elements of the amount storing means drawn out from one another and viewed in the same direction as in Fig. 5.

Figure 8:
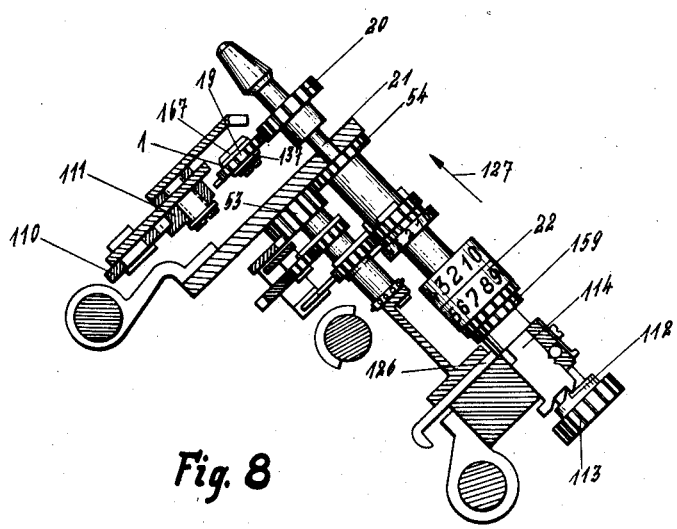

Figure 8 shows a part section according to Fig. 6 with the amount storing means, in the working position.

Figure 9 shows an elevation in perspective of the shifting mechanism arranged within the machine on the right hand side for the amount storing means and totalling device, the mechanism being in that rest position in which no value tained in the amount storing means.

Figure 10 shows a similar elevation to Fig. 9, but in that rest position in which a value is contained in the amount storing means Figure 11 shows in perspective the group of levers indicated in Figs. 9 and 10, the levers being drawn out from one another for purposes of illustration.

Figure 12:
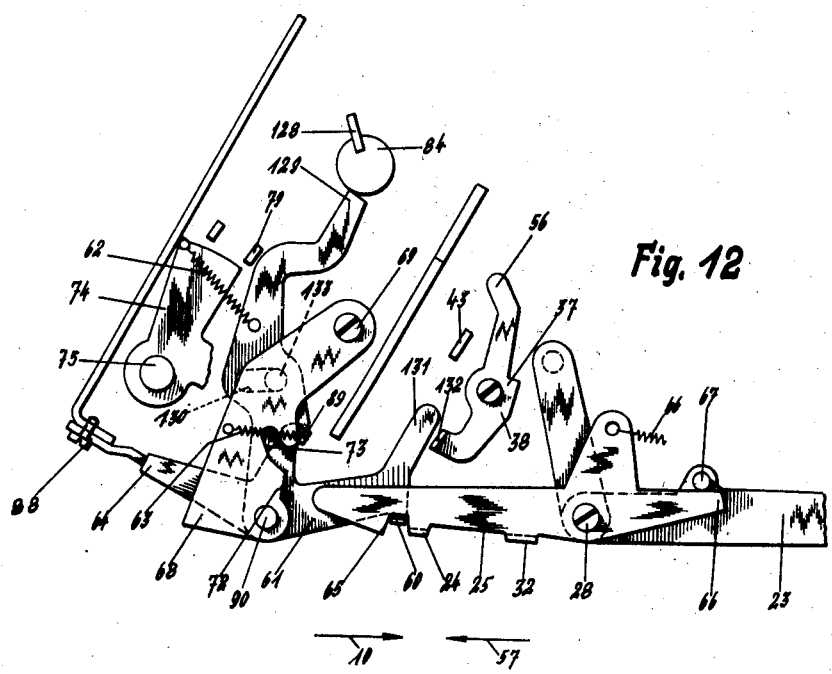

Figure 12 shows a side elevation of the device illustrated in Figs. 9 and 10 the position of the parts being somewhat changed.

Figure 13:
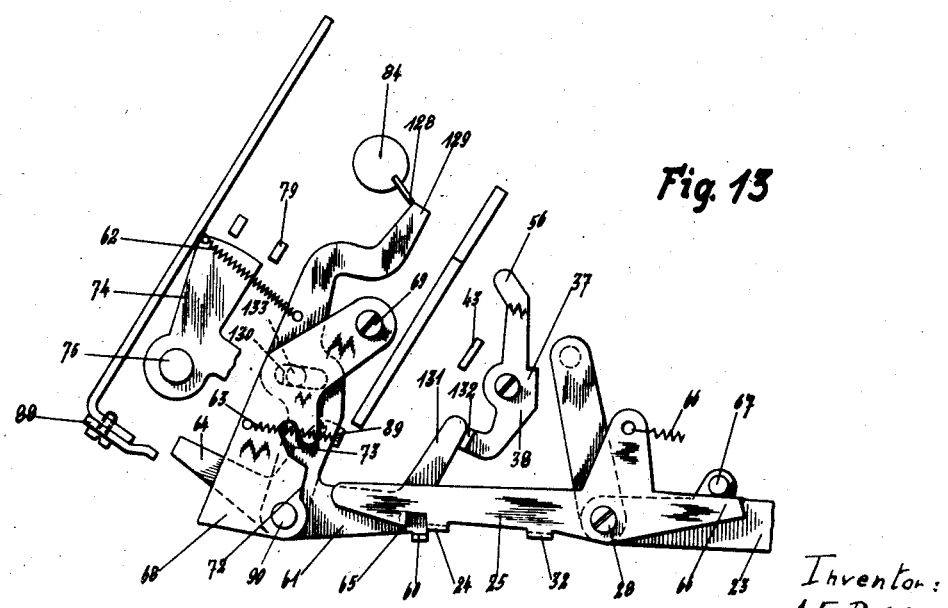

Figure 13 shows the same view as Fig. 12 at the instant, however, in which after depression of the total key, the driving connection between the key and the control mechanism of the shifting mechanism clutch is released through the driving movement of the same.

Figure 14:
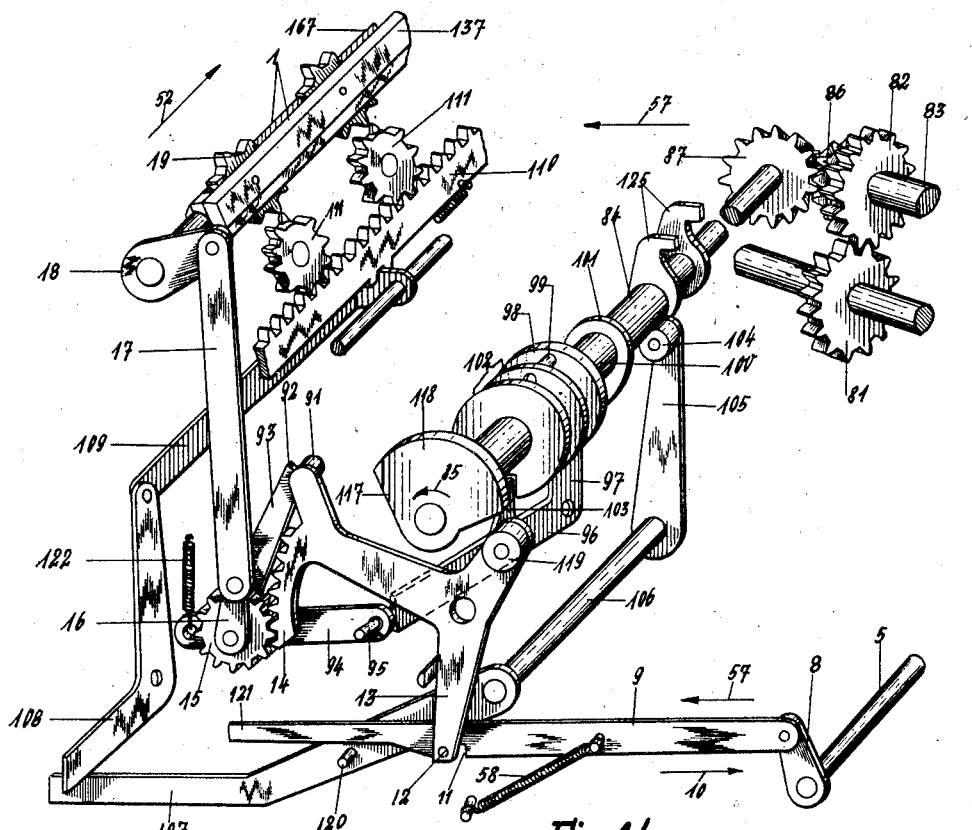

Figure 14 shows a perspective representation of the parts arranged within the machine on the left hand side and viewed from the front left hand side of the machine.

Figure 15:
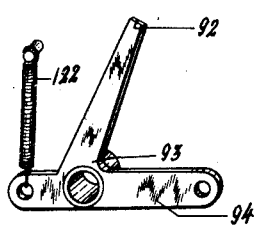

Figure 15 shows in perspective a detail of Fig. 14.

Figure 16:
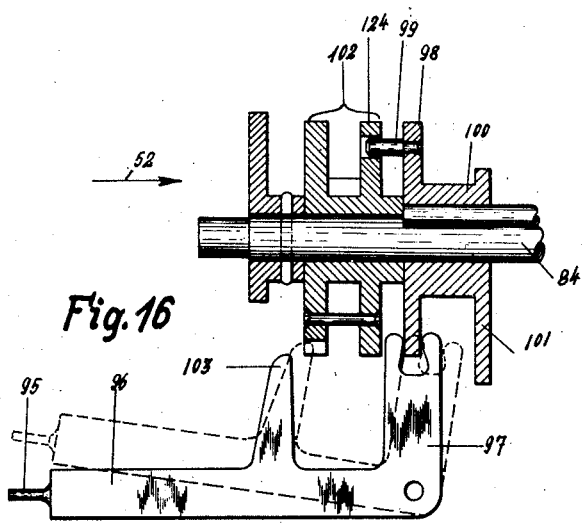

Figure 16 shows a fragmentary longitudinal section of some details of Fig. 14.

Figure 17 shows in perspective the three right hand wheels sets of the accumulator and the amount storing means as viewed from the rear of the machine.

Figure 18 shows a perspective of the amount storing means provided with an approximation device.

Figures 19 and 20 show two different views of a detail in perspective representation, Fig. 19 showing the wheel for measuring off the five units, on an enlarged scale viewed from in front of the machine and Figure 20 shows the same wheel viewed from the rear of the machine.

Figure 21 shows a perspective representation of the resetting members modified according to the invention, the parts for purposes of illustration being separated from one another.

Figure 22:
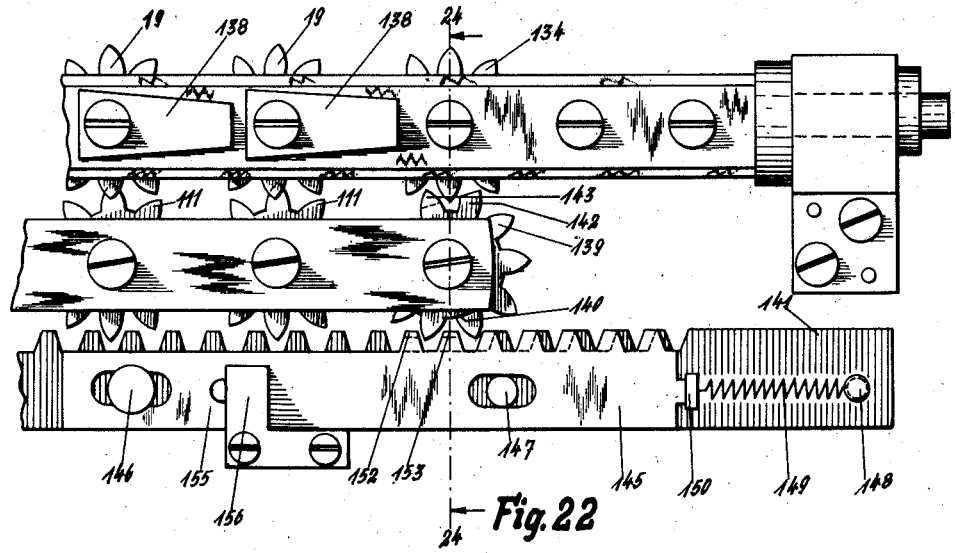

Figure 22 shows an elevation according to Fig. 18 on an enlarged scale, with the resetting member in the working position of the same after the completed transfer of the five units for the approximation.

Figure 23:
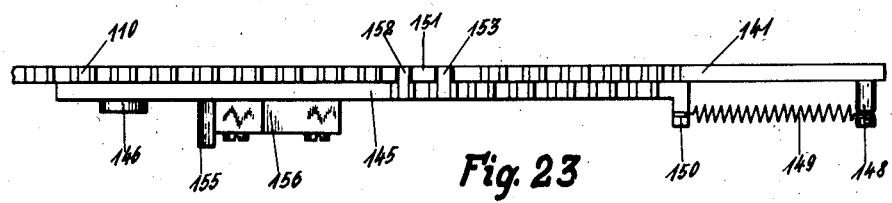

Figure 23 shows a plan of the resetting member.

Figure 24:
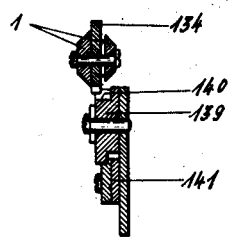

Figure 24 shows a section according to the line 24—24 in Fig. 22 viewed in the direction of the arrows at said line.

Figure 25:
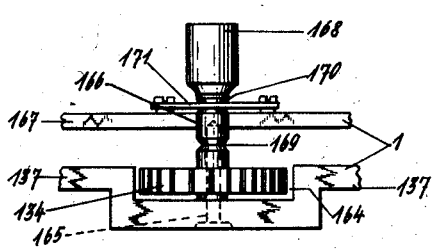

Figure 25 shows a device for cutting out the approximating device at will.

Figures 26 to 32 show diagrammatically the positions of the register carriage for the example of calculation hereinafter mentioned.

*Operation for entering a value into the amount storing means*

For the sake of a better understanding of the present invention it seems advisable to briefly set forth the operation for entering a value into the amount storing means 1 (Figs. 5, 6, 8, 14, 18).

In Fig. 1, RC indicates the revolution counter, A the accumulator and K the keyboard of the machine.

In order now to enter a value, which stands already in the accumulator A (Figs. 26 to 32) into the amount stornig means 1 (Figs. 5, 6 and 14) it is only necessary to depress the total transfer key 3 (Figs. 1, 9, 10, 26). On the depression of the total key 3 (Fig. 1) the following operations take place.

The key lever 4 (Figs. 9, 10) is swung in the anti-clockwise direction. Hereby the shaft 5 the crank arm 6 of which is embraced by the fork 7 of the key lever 4, is swung in the clockwise direction and with it the lever 8 (Fig. 14).

The rod 9 jointed to the lever 8 is displaced in the direction of the arrow 10 whereby through the recess 11 engaging with the pin 12 of the three-armed lever 13, the lever 13 is swung in the anti-clockwise direction, consequently the toothed segment 14 of the same rotates the toothed wheel 15 and the crank arm 16 fixed to it in the clockwise direction. Consequently, the rod 17 is drawn downwards and swings the arm 18 fixed to the amount storing means 1 and therewith the amount storing means 1 itself in the clockwise direction, so that the amount storing means 1 is swung from the position represented in Fig. 6 to the position represented in Fig. 8, in which the wheels 19 are in engagement with the toothed wheels 20 fixed on the numeral wheel shafts 21, so that when the numeral wheels 22 and therefore the numeral wheel shafts 21 are now returned to zero, a transfer of the value from the accumulator A to the amount storing means 1 takes place.

After the wheels 19 therefore are in engagement in this manner with the wheels 20 fixed on the numeral wheel shafts 21 according to Fig. 8, the actual transfer of the value from the accumulator A to the amount storing means 1 will be hereinafter described in detail.

On the swinging of the key lever 4 in the anti-clockwise direction resulting from the depression of the total transfer key 3 (Figs. 9 and 10) the rod 23 is drawn forward in the direction of the arrow 10. The lug 24 of the retaining hook 25 then runs upon the incline 26 of the fixed projection 27. Consequently the retaining hook 25 is swung round the screw 28 in the clockwise direction against the action of the spring 29 and as the nose 30 of the retaining hook 31 which is also swingable around the screw 28 rests on the lug 32 of the retaining hook 25, the retaining hook 31 is also swung in the clockwise direction. The incline 26 of the projection 27 is so dimensioned that the two retaining hooks 25 and 31 are swung so far in the clockwise direction in Fig. 9 that the recess 33 of the retaining hook 31 embraces the arm 34 of the rod 35 after a short movement of the rod 23 in the direction of the arrow 10, whereby naturally between the nose 36 of the retaining hook 31, and the nose 37 of the member 38, a corresponding amount of play has taken place. On the further forward movement of the rod 23 in the direction of the arrow 10, the lug 24 of the retaining hook 25 runs along the straight upper face of the projection 27, whereby the engagement of the recess 33 of the retaining hook 31 with the arm 34 is secured positively as long as the total transfer key 3 is held depressed, i. e., the lug 24 of the retaining hook 25 does not leave the upper face of the projection 27 towards the right. During the passage of the lug 24 along the straight upper face of the projection 27, the rod 35 is consequently taken along with it in the direction of the arrow 10.

Figure 3:
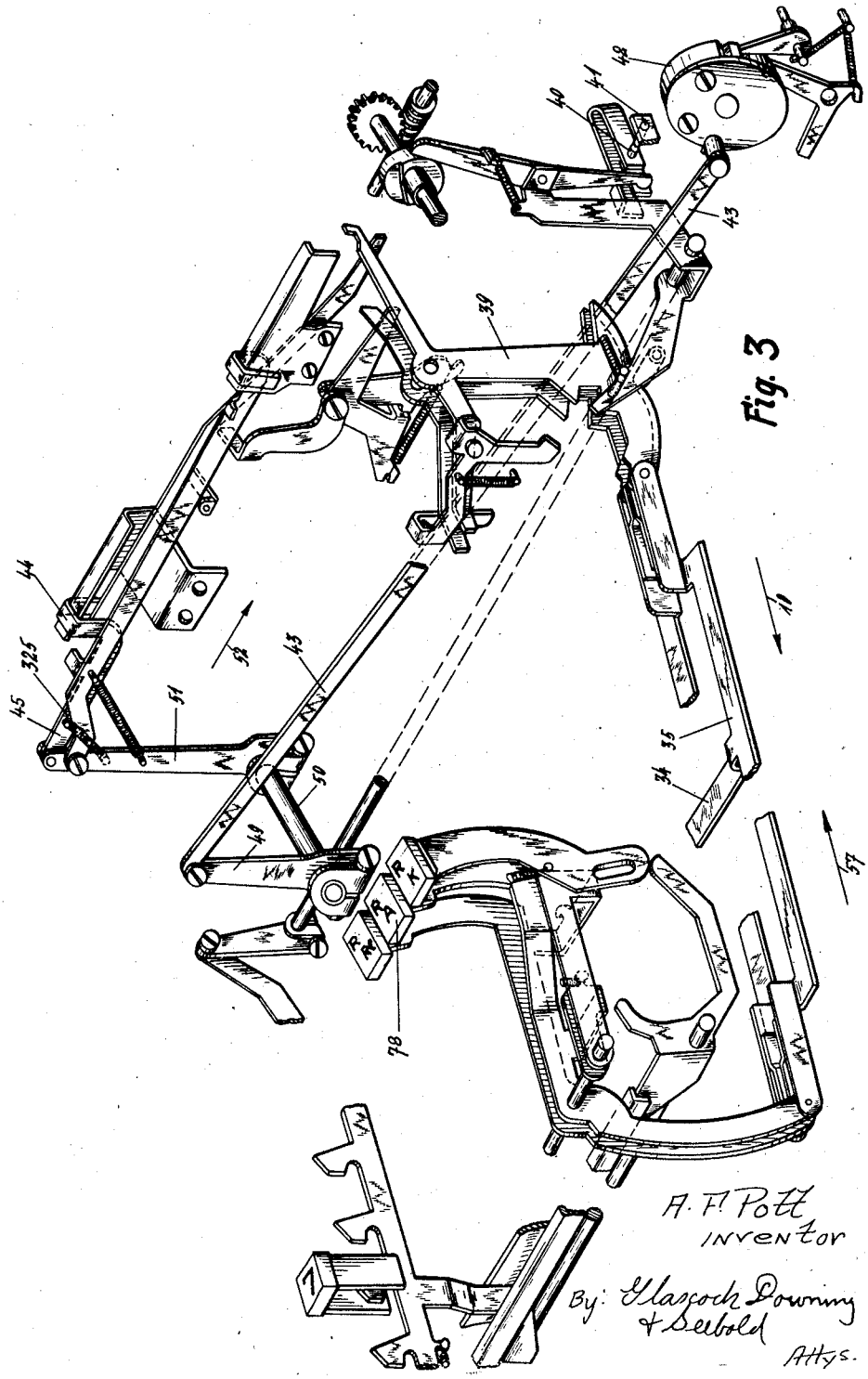

Hereby the rod 35 rocks the lever 39, as viewed in Figure 3, in the clockwise direction, whereby on the one hand, the motor contact 40, 41 and the resetting clutch 42 are closed which latter operates the rod 43, whereas on the other hand, the part 44 (Fig. 3) of the lever 45 engages with the adjacent recess 46 (Figures 4 and 5) of the resetting bar 47, 48 so that the latter is moved by the part 44 through the parts 50 and 51 interconnected with the rod 43, in the direction of the arrow 52 indicated in Figs. 5 and 4.

Consequently all the toothed wheels 53 (Fig. 5) are rotated in the anti-clockwise direction while the wheels 54 of the numeral wheel shafts 21 which are not at zero together with the numeral wheels 22 are rotated so far in the clockwise direction that the zero spaces 55 of the wheels 54 lie opposite the resetting wheels 53, in which position the numeral wheels 22 are at zero.

As however, the wheels 20 fixed on the numeral wheel shafts 21, as above mentioned, are in engagement with the wheels 19, the value contained in the accumulator A is transferred to the wheels 19 in the anti-clockwise direction.

This bringing in operation is of course only effected after the engagement of the wheels 19 with the toothed wheels 20 is secured by the parts represented in Fig. 14.

During the movement of the rod 43 (Fig. 9) the same moved upwards against the arm 56 and has thereby swung the lever 38 from the position according to Fig. 9 into the position according to Fig. 10, whereby the same points to the mark S and thus indicates that a value is contained in the amount storing means 1.

When the total transfer key 3 is released the rod 23 (Fig. 9) moves in the direction of the arrow 57 under the action of the springs 29 and 58 (Figs. 9 and 14) back into its rest position and with it the rod 35 whereby the resetting clutch 42 is again opened and the above mentioned driving connection between the rod 43 and the resetting bar 47, 48 is again broken. Besides, the lug 24 of the retaining hook 25 again slides along on the straight upper face of the projection 27 and as soon as it falls down to the left of the projection, the connection at 33, 34 is released through the swinging movement of both of the retaining hooks 31 and 25 in the anti-clockwise direction owing to the action of the spring 29. Further, the inclined edge 59 of the retaining hook 25 runs up on the lug 60 of the lever 61. As the spring 29 attached to the retaining hook 31 is weaker than the springs 62 and 63 engaging with the levers 61 and 64, the retaining hooks 25 and 31, on the sliding of the inclined edge 59 up on the lug 60 of the lever 61, are first swung somewhat in the clockwise direction which is without importance.

As soon as the rod 23 has returned to its rest position, represented in Fig. 10, the spring 29 connected to the retaining hook 31 comes into operation and swings the retaining hooks 31 and 25 into the position represented in Fig. 10, in which position the recess 65 of the retaining hook 25 snaps over the lug 60 of the lever 61.

The retaining hooks 31 and 25 can swing freely into the position represented in Fig. 10, owing to the fact that the nose 37 of the member 38 offers now no resistance to the nose 36 of the retaining hook 31. The end 66 of the retaining hook 25 then lies against the pin 67 of the rod 23 in order to permit some play between the recess 65 of the retaining hook 25 and the lug 60 of the lever 61. By the release of the total transfer key 3 the parts 5, 8 (Fig. 14) 9, 13, 14, 15, 16, 17, 18 have returned to their normal position represented in Fig. 14.

*Operation of the transfer of a value from the amount storing means to the accumulator*

To that end, it may be assumed that the accumulator A displays an item.

If it is desired to obtain the sum of this item and of the item contained in the amount storing means 1, it is only necessary to depress again the total transfer key 3. In this case, however the item displayed by the accumulator A is not transferred to the amount storing means 1 but the item contained in the amount storing means 1 is added to the item standing in the accumulator A by zeroizing the wheels 19.

This comes to pass in the following manner.

As soon as a value is present in the amount storing means 1, the parts located on the right hand side of the machine, assume the position represented in Fig. 12 while the parts (Fig. 14) located on the left hand side of the machine always take up one and the same rest position.

If now the total transfer key 3 is depressed to begin with the amount storing means 1 is swung out of the position according to Fig. 6 into the position according to Fig. 8 through the parts 8 (Fig. 14), 9, 11, 12, 13, 14, 15, 16, 17 and 18 in the manner already described above.

On depression of the total transfer key 3, the rod 23 is moved in the direction of the arrow 10 (Fig. 10).

Figure 2:
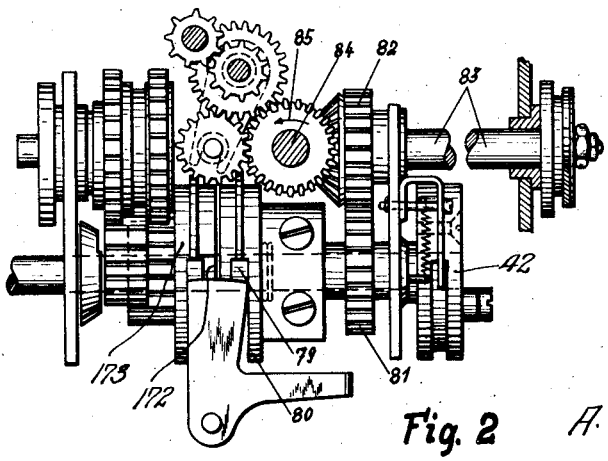

In the movement of the rod 23 in the direction of the arrow 10, the recess 65 of the retaining hook 25 takes the lug 60 of the lever 61 along with it in the direction of the arrow 10, whereby the lug 24 of the retaining hook 25 slides along the the under side of the projection 27 so that, as long as the total transfer key 3 is held depressed, the engagement of the recess 65 of the retaining hook 25 with the lug 60 of the lever 61 is ensured by the projection 27, i. e. the lug 24 of the retaining hook 25 does not leave the projection in the movement towards the right. Accordingly the three levers 61, 64, and 68 (Fig. 11) are swung together round the screw 69 in the anti-clockwise direction. In this movement the pin 70 of the lever 71 slides up on the upper inclined edge of the nose 72 (Fig. 11) of the slot 73 of the lever 68. At this moment, the clutch lever 74 has already been displaced so far through the pin 70, the lever 71 and the shaft 75, that its lug 76 (Fig. 9) lies above the recess 77 of the lever 39, so that on any unintentional depression of the resetting key 78 from this instant on, no resetting of the accumulator A is possible. On the further swinging of the lever 68 in the anti-clockwise direction, the pin 70 enters the slot 73 of the lever 68, whereby the shaft 75 rigidly fixed to the lever 71 is further swung in the anti-clockwise direction and with it also the clutch lever 74. This now releases the pawl 79 of the coupling 80 for the differential actuating mechanism whereby this clutch is closed. By this release of the pawl 79, the pawl 172 of the carriage shift clutch 173 is further held in its inoperative position by the lever 74 so that the carriage shift clutch cannot be operated. Consequently through the wheel 81 (Figs. 2, 9 and 14) not only the wheel 82 and the driving shaft 83 for the differential actuating mechanism are rotated but also the tens carrying shaft 84 is driven in the direction of the arrow 85 by means of the wheels 82, 86 and 87.

Further, the lug 60 (Fig. 10) of the lever 61 in consequence of its swinging movement in the anti-clockwise direction (the lug 60 being thereby raised somewhat), has swung the retaining hooks 25 and 31, so far in the clockwise direction against the action of the spring 29 that they again take up the horizontal position represented in Fig. 12, which, in consequence of the corresponding formation of the lower face of the projection 27, they are capable of freely doing.

In the swinging movement of the levers 68, 61 and 64, around the screw 69 in the anti-clockwise direction, the horizontal arm of the lever 64 (Fig. 10) moves along the upper face of the projection 88 whereby in consequence of the yielding arrangement provided by the spring 63 engaging with its lug 89, the lever 64 is permitted to swing somewhat in the clockwise direction round the screw 90 and directly after leaving the projection 88 is swung under the action of its spring 63 in the anti-clockwise direction and so as to lie in front of the projection 88 as shown in Fig. 12, whereby even if the total transfer key 3 should be prematurely released, cannot spring upward, because the parts 88, 64, 61, 60, 65, 25, 28 as positioned in Fig. 12 hold the rod 23 displaced in the direction of the arrow 10 and therefore the key 3 will be held in depressed position.

Further, it has been mentioned above that the tens carrying shaft 84 (Fig. 14) rotates in the anti-clockwise direction by the closing of the clutch 80 for the differential actuating mechanism. However, on depression of the total transfer key 3, the three armed lever 13 (Fig. 14) was swung in the anti-clockwise direction. On the swinging movement of the three-armed lever 13 the roller 91 (Fig. 14) of the lever 13 acted on the inclined face 92 of the lever 93 and swung this lever in the anti-clockwise direction, whereby the horizontal arm 94 of the lever 93, by means of the pin 95 of the angle lever 96 swings the angle lever in the clockwise direction (Fig. 16). Consequently, by means of the upwardly projecting fork arm 97 of the lever 96 the element consisting of the parts 98, 99 to 101 on the tens carrying shaft 84, is displaced in the direction of the arrow 52 whereby the pin 99 of the element 98, 99 to 101 releases the pin wheel 102 and the arm 103 of the angle lever 96 secures the same against rotational displacement. At the movement of the parts 93, 96, 98, 99 to 101 the cam 101 comes in the path of the roller 104 of the lever 105. Now, as the cam 101 is located in the path of the roller 104 it acts on the roller 104, whereby the parts 105, 106 and 107 are swung in the clockwise direction. The angle lever 108 is therefore likewise swung in the clockwise direction so that the rod 109 and with it the resetting bar 110 are displaced in the direction of the arrow 52. By this means, all the resetting wheels 111 are rotated in the anti-clockwise direction (Figs. 14 and 5). Consequently, those wheels 19 which do not stand at zero, are returned to zero in the clockwise direction and as they are in engagement with the toothed wheels 20, fixed to the numeral wheel shaft 21, the wheels 20 together with the shaft 21 and the attached numeral wheels 22 are rotated in the anti-clockwise direction, whereby the item contained in the amount storing means 1 is added to the item, standing in the accumulator A. If for instance, in consequence of the addition of both items, a tens transfer takes place in the second calculating place from the right, the tens transfer is only prepared by the nose 112 (Figs. 6 and 8) of the wheel 113 of the second numeral wheel shaft 21 from the right by moving the preparatory member 114 forward in the direction of the arrow 127.

Before, however, the tens transfer so prepared can be executed, it is necessary to return the amount storing means 1 into its inoperative position represented in Fig. 6, as otherwise breakage of a tooth may take place since the wheels 19 already standing at zero in consequence of the striking of their projections 115 (Fig. 7) against the pins 116, are prevented from a further clockwise rotation as would arise from a tens transfer.

This is avoided in the following manner:

In the resetting of the amount storing means 1 the tens carrying shaft 84 (Fig. 14) has rotated so far that the edge 117 of the disc 118 fixed on this shaft has operated the roller 119 of the lever 13. As a result, the lever 13 which is still with the upper end of its rack 14 in engagement with wheel 15, is now rocked in the clockwise direction which it can do freely, as shortly before the parts 105, 106, 107 were swung by the cam 101 in the clockwise direction and therefore the pin 120 of the lever 107 by acting on the end 121 of the rod 9 has raised the recess 11 of the said rod from the pin 12 of the lever 13.

By the swinging movement of the lever 13 in the clockwise direction, the amount storing means 1 is moved into its inoperative position as represented in Figs. 14 and 6 in the manner already described through the parts 15, 16, 17 and 18, whereby the end 121 of the rod 9, which is still held displaced in the direction of the arrow 10 (Fig. 14) rests on the pin 12 of the lever 13, while the roller 119 of the lever 13 runs along on the concentric part of the cam 118.

By the swinging movement of the lever 13 in the clockwise direction the roller 91, however, has also released the lever 93, so that this is now under the action of its spring 122 but cannot yet swing in the clockwise direction for the following reasons. The tensioned spring 122 (Figs. 14 and 15) tends to rock the lever 93 in the clockwise direction. Accordingly its arm 94 tends to rock lever 96, 97 (Fig. 16) from its position shown in dotted lines in Fig. 16 to the position shown in solid lines which however is not possible, since pin 99 of the element 98, 100, 101, cannot enter the hole in the right hand side disc 124 of pin wheel 102, until the element 98, 100, 101 has performed a complete revolution. Consequently, also lever 93 is not permitted to rock clockwise.

Immediately after the amount storing means 1 has again taken up its rest position illustrated in Fig. 6, the tens transfer process takes place by raising, by means of the eccentrics 125 attached to the tens carrying shaft 84 (Fig. 14), all the tens carrying members 126 (Fig. 6). As now only the preparatory member 114 in the tens denomination was displaced in the direction of the arrow 127, so by the upward movement of its associated tens carrying member 126, the latter is swung to the left, whereby the numeral wheel 22 of the hundreds denomination is rotated one unit further. Consequently the transference from the amount storing means 1 to the accumulator A and the totalling of the both items are completed. Now, the mechanisms should be returned to their rest position and in doing so, care must be taken that no second rotation of the drive shaft 83 for the differential actuating mechanism is brought about.

This takes places in the following manner:

Before completion of the first complete revolution of the tens carrying shaft 84, the strip 128 (Fig. 12) fixed on the right hand end of this shaft engages the end 129 of the lever 61. In Fig. 13 is shown the position at the moment when the lever 61 is being swung by the strip 128.

By the engagement of the strip 128 with the upper end of the lever 61, the lever 61 is swung against the action of the spring 62 connected to it, in the clockwise direction round the screw 98 (Fig. 11) of the lever 68 and, of course, approximately for an amount represented by the length of the slot 130. The lug 60 (Fig. 13) is thereby withdrawn from the recess 25 of the retaining hook 26. Its arm 131 acts on the lug 132 of the member 38 and swings the same out of the position according to Figs. 12 and 10 and into the position according to Figs. 13 and 9 in which latter position the member 38 again points to the mark C (Fig. 10) and indicates to the operator that no value is contained in the amount storing means 1, therefore the amount storing means 1 is reset.

In the swinging movement of the lever 61 in the clockwise direction (Fig. 13) it acts also on the lug 89 of the lever 64 and swings the latter likewise in the clockwise direction against the action of the spring 63, whereby the arm of the lever 64 releases the projection 88 as is represented in Fig. 13. As at this moment the strip 128 of the tens carrying shaft 84 still acts on the upper end 129 of the lever 61, the spring 62 acting on the lever 61 can now come into operation. As the pull of the spring 62, by means of the screw 98 is transmitted to the lever 68, the latter is swung round the screw 69 in the clockwise direction. In this movement, the horizontal arm of the lever 64 again extends over the projection 88 (Fig. 10) and the lever 68 is drawn against the projection 88 whereby the right hand end of the slot 130 of the lever 61 also comes to rest on the pin 133 of the lever 68.

At this juncture the pin 70 of the lever 71 has also again slid out of the slot 73 of the lever 68 according to Fig. 10, so that this latter lever, and with it the shaft 75 and the clutch lever 74 under the action of a spring (not illustrated) again take up their rest position in which the clutch

80 for the differential actuating mechanism is opened and thus only one revolution could be performed.

Finally after the completed revolution of the tens carrying shaft 84 (Fig. 14) the pin 99 under the action of the spring 122 has again entered the hole of the right hand side disc 124 of the pin wheel 102 and has again coupled this with the tens carrying shaft 84.

Moreover, the cam 101 has again been brought out of the path of movement of the roller 104 and also the total transfer key 3 has returned to normal position.

From the foregoing it may be seen that on the depression of the total transfer key 3, the accumulator A is coupled with the amount storing means 1 and the accumulator A is zeroized by the rack 48 (Fig. 4) according to which the amount standing in the accumulator A is transferred to the amount storing means 1.

If the total transfer key 3 is again depressed the accumulator A is also coupled with the amount storing means 1, but now the amount storing means 1 is zeroized by the rack 110 (Fig. 14) transferring thereby the amount from the amount storing means 1 to the accumulator A and adding such amount to the amount eventually present in the accumulator A.

Accordingly, the repeated actuation of the total transfer key 3 transmits alternatingly amounts from the accumulator A to the amount storing means 1 and vice versa.

After this brief description of the known mechanism of the machine disclosed by my above mentioned copending application Ser. No. 35,389, the invention proper will now be described in detail, the object of which is to eliminate decimals while transferring from the amount storing means 1 to the accumulator A.

*Decimal approximating mechanism*

If it is desired to approximate the last registered digit that is that digit which is opposite the units denomination wheel 19 of the amount storing means the following mechanism is provided.

To the right of the units denomination wheel 19 (Fig. 18) there is arranged a 10-toothed wheel 134 of the same size as the wheels 19. This wheel 134 is provided with stops similar to the stops 135 (Fig. 7) of the wheels 19 with which stops a ball 136 (Fig. 7) engages arranged in a hole of the strip 137 and acted upon by a blade spring 138. In contradistinction to the remaining wheels 19, the wheel 134 has neither a zero projection 115 (Fig. 7) nor a partly enlarged tooth space 115a formed by removing half of the breadth of the tooth. Below the toothed wheel 134, an additional wheel 139 (Fig. 18) is arranged. In the rest position of the resetting bar 110, the toothed wheel 139 is so located, that the enlarged tooth-space 140 (Figs. 19 and 20) formed by the removal of half the breadth of a tooth, lies opposite to the toothed wheel 134, and does not prevent the wheel 134 from freely rotating in the working position of the amount storing means 1. The resetting bar 110 (Figs. 18, 21 and 22) is provided at its right hand end with a straight projection 141 equal in height to the teeth of the resetting bar 110. The toothed wheel 139 (Figs. 19 and 20) has, on the opposite side to the tooth-space, above described, three flattened-off teeth 142, 143, and 144 of which the teeth 142 and 144 are only partially flattened off, while the tooth 143 is completely flattened off with regard to its tooth-thickness. In the rest position of the resetting bar 110, the three flattened off teeth, 142, 143 and 144 rest on the projection 141 of the resetting bar 110 and thereby prevent an unintentional rotation of the wheel 139. On the resetting bar 110 (Figs. 18 and 21) a small rack 145 is slidably attached by means of pins 146 and 147. To the pin 148 of the resetting bar 110, a draw spring 149 is attached and draws the bar 145 by means of its spring hook 150 to the right, so that the bar 145 contacts with the guide pin 147. In this position the teeth of the resetting bars 110 and 145 are in register. At 151 (Fig. 21) two teeth are removed from the resetting bar 110 and into the space thus formed project two laterally extended teeth 152 and 153 of the bar 145. The aim of this arrangement will be described later in detail.

If the resetting rack 110 in the cancelling operation of the amount storing means 1, resulting from depression of the total transfer key 3 (Fig. 10) is moved from the normal position (Fig. 18) towards the right (Fig. 22) the small bar 145 is likewise moved to the right along with the rack 110. In this movement towards the right of the resetting bar 110, the toothed wheel 139, to commence with, remains at rest until the first tooth 154 (Fig. 21) of the small bar 145 presses on the half-breadth tooth 143 of the toothed wheel 139. The toothed wheel 139 is thereby rotated in the anti-clockwise direction through 5½ tooth divisions (see Fig. 22). The toothed wheel 134 at the same time is rotated through five teeth in the clockwise direction. The pin 155 (Fig. 21) of the bar 145 at this point abuts against the bearing member 156 (Fig. 22) located on the rear wall whereby the movement of the rack 145 is limited. As manufacturing difficulties arise in producing the resetting bar 110 exactly dimensioned in this manner, the resetting bar 110, as is shown in Fig. 22 is permitted to move to the extent of half the width of a tooth farther with regard to the small bar 145. The tension spring 149, which connects the two bars 110 and 145 is thus tensioned. The wheel 139 is, however, not rotated further, for in this position the teeth 152 and 153 which are extended laterally of the bar 145, and project within the wider tooth space 151 (Figs. 21 and 23) which as already mentioned is formed by the removal of two teeth from the resetting bar 110 engage with the wheel 139. The other resetting wheels 111, on the contrary, during the above mentioned extended movement of the resetting bar 110, are inoperatively rotated further through half of one tooth division, which can happen unimpeded, since at that time the wheels 19 of the amount storing means 1 have rotated back to zero and in this position of the wheels 19, the wider tooth space 158 formed by the removal from a tooth of half its breadth, lies opposite to the resetting wheels 111 and permits their free passage therethrough.

By the rotation of the toothed wheel 134 in the clockwise direction, however, the corresponding wheel 20 (Fig. 18) which stands opposite to it, together with the numeral wheel shaft 21 rigidly connected to it and the numeral wheel 22 are rotated anti-clockwise. If prior to the rotation of the wheel 134 in the clockwise direction, there stands on the numeral wheel 22 which is just in driving connection with the wheel 134, e. g., the number "5," or a greater number than "5," then the corresponding numeral wheel 22 is rotated from "5" over "6," "7," etc., to "0." Accordingly, while rotating from "9" to "0" a tens transfer is brought about by the parts 112, 114, 126, 159 (Figs. 6 and 8) to the numeral wheel 22 of next higher denomination, whereby the digit in this denomination is increased by "1."

In the following numerical example, the manner of operation is once more illustrated.

It may be assumed that the product 1.9584 stands in the accumulator A.

As mentioned above, it is usual only to calculate whole pfennigs amounts, and consequently the product is approximated in the second place after the comma. To this end, the carriage 160 is brought to the position represented in Fig. 26, in which, therefore, the numeral wheel 22 of the tens denomination of the accumulator A which shows the number "8" of the product "1.9584" lies opposite to the wheel 134 of the amount storing means 1 (Fig. 18.) The broken line 161—161 shows in Fig. 26 the regular position of the lowest decimal place of the amount storing means 1.

If it is desired to directly approximate the product standing in the accumulator, care should be taken that prior to the multiplication the amount storing means 1 is at zero and that the hook unit 31, 25 assumes the Fig. 10 position.

If the amount storing means 1 is not at zero and the hook unit 31, 25 assumes the Fig. 10 position, the total transfer key 3 is depressed whereby as has been pointed out, the amount storing means 1 is zeroized, its amount is transferred to the accumulator A and the hook unit 25 is shifted to the Fig. 9 position. Thereupon the accumulator A is zeroized by depression of the key 78. In order to shift the hook unit again to the Fig. 10 position, the total transfer key 3 is depressed. As however, the accumulator A is already at zero, no transfer to the amount storing means 1 takes place, that is to say, the latter remains at zero while the hook unit 31, 25 assumes again its Fig. 10 position.

Figure 26:
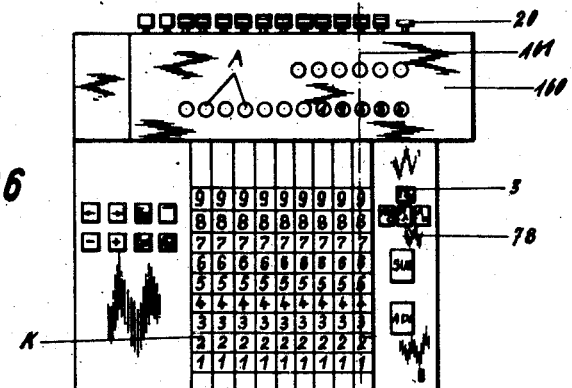

After this manipulation has been made, the multiplication process is performed, after which the accumulator A displays the product 1.9584 and the carriage 160 assumes the position illustrated in Figs. 26 and 18, that is to say the tens denomination of the accumulator A is opposite the wheel 134.

Figure 27:
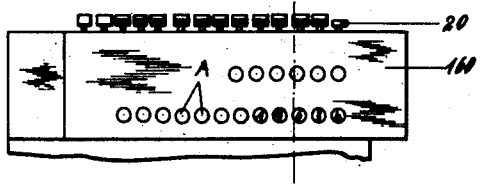
Figure 28:
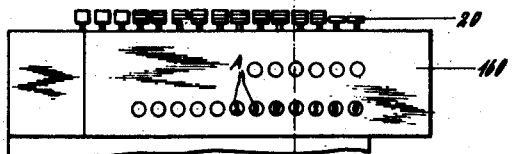

If now the total transfer key 3 is depressed a resetting operation of the amount storing means 1 takes place in which the resetting bar 118 and with it the small bar 145 are moved to the right (Fig. 18). The resetting wheels 111 thereupon rotate in the anti-clockwise direction, and after the flat part 141 of the bar 118 has passed along the short teeth 142 to 143 (Fig. 20) likewise the toothed wheel 139 is rotated. As in the amount storing means 1, no value is present, the numeral wheel shafts 21 the numeral wheels 22 respectively are not rotated further with the exception of the numeral wheel 22 of the tens denomination in which by rotation of the toothed wheels 139 and 134 a "5" is added whereby the "8" is changed to "3" (Fig. 27). As in this movement of the numeral wheel 22 of the tens denomination, the "9" is passed through, a tens transfer is effected through the intermediary of the parts 112, 114, 126 and 159 to the numeral wheel 22 of the hundreds denomination, whereby the "5" on this numeral wheel is changed to a "6." Accordingly, as the numeral wheel of the units denomination has remained unaffected, the value "1.9634" (Fig. 27) is now displayed in the accumulator A. If now, the indication of the last two numeral wheels 22 to the right is taken out of consideration, the value "1.96" is the approximated value of "1.9584."

If, however, it is desired to store the value "1.96" in the amount storing means 1 it is only necessary to depress the total transfer key 3, whereby the accumulator A is reset. Thereby the "4" in the units denomination of the accumulator A gets lost, because no wheel of the amount storing means 1 is opposite that denomination. The "3" in the tens denomination is transferred to the wheel 134, whereas the value "1.96" is transferred to the corresponding wheels 20 of the amount storing means 1.

Now it may be assumed that a new product, for instance, 26.02360 (Fig. 28) stands in the accumulator A and that the carriage is already in the suitable position. If now the total transfer key 3 is depressed, the first value 1.96 contained in the amount storing means 1, is added to the product 26.02360 standing in the accumulator A with the bringing in of the additional "5" in the following manner.

Figure 29:
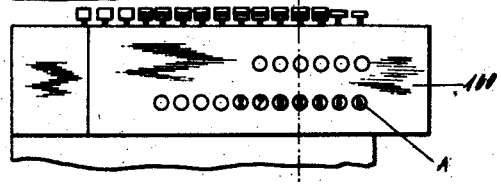
Figure 30:
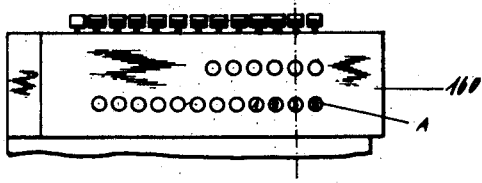

26.02360 product standing in the accumulator A (Fig. 28)
1.96
5
—————
27.98860 (Fig. 29)

It has been pointed out that in the transfer of the product "1.9634" a "3" was transferred to the wheel 134. This is however without any importance, since the wheel 134 has no zero space which could co-operate with the zero space 140 of the wheel 139. Therefore, the wheel 134 serves merely as an intermediary wheel and not as an amount storing wheel as to the wheels 20. Accordingly in any transfer from the amount storing means 1 to the accumulator A, the multilated wheel 139 transfers always a "5" regardless of the actual position of the wheel 134.

Consequently as the numeral wheel 22 of the hundreds denomination of the accumulator A in the last product displays a "3" (Fig. 28) a "5" is added so that this wheel displays an "8" as is evident from Fig. 29. Accordingly, no tens carrying movement takes place to the thousands denomination which with regard to approximation purposes is correct.

By depression of the total transfer key 3, the value 27.98 now comes into the amount storing means 1 while the three last decimals "860" disappear.

The third product may be 1.938 standing in the accumulator A. The register carriage 160 is in the position according to Fig. 30.

Now, the total transfer key 3 is again depressed, whereby the value 27.98 contained in the amount storing means 1 is added to the value, 1.938 standing in the accumulator A with the bringing-in of the additional "5" in the following manner.

Figure 31:
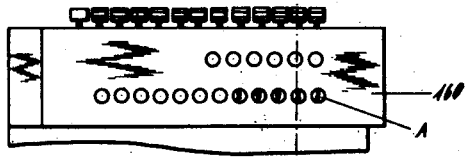
Figure 32:
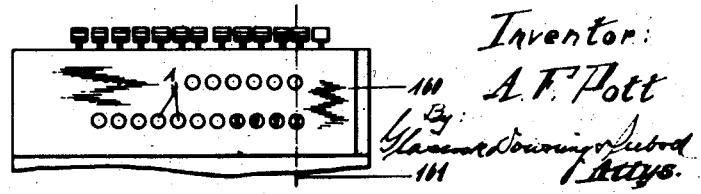

1.938 Value standing in the accumulator A (Fig. 30)
27.98 Value contained in amount storing means 1
5 Approximation from the toothed wheel 139.
—————
29.923 (Fig. 31).

In this result, as is evident, an approximating of the next higher numeral wheel next to the position of the wheel 134 takes place.

The total transfer key 3 is again depressed, whereby the value 29.923 is transferred into the amount storing means 1 while the "3" in the third decimal place to the right of the decimal point disappears.

The carriage 160 is now moved into its extreme left position, and the total transfer key 3 is again depressed, whereupon the value 29.92 (Fig. 32) appears in the accumulator A. In this operation no "5" is brought in by the wheel 139, as in the extreme left position of the carriage 160, none of the wheels 20 or numeral wheels 22 lie opposite to the wheel 134.

There is therefore in the transfer from the amount storing means 1 to the accumulator A always a "5" brought in by the wheel 139 into the denomination lying opposite to it.

As this, occasionally is undesirable, in Fig. 25, a construction is shown in which the wheel 134 may be disconnected at will.

To this end, the part 137 of the amount storing means 1, is provided with a yoke like recess 164. Into this part 137 a pin 165 is riveted. On the same a sleeve 166 is rotatably, and slidably mounted, and is likewise rotatably and slidably mounted in the part 167. On the sleeve 166, the wheel 34 and a knob 168 are attached. The sleeve 166 is provided with two ring grooves 169 and 170 with which a wire spring 171 attached to the part 167 may engage, so that the sleeve 166 and with it, the wheel 134 may be held in the desired position.

If the spring 171 engages with the groove 170, the wheel 134 does not engage with the wheel 139 and consequently no transfer of five units to the accumulator A results. If, on the contrary, the sleeve 166 with the wheel 134 is displaced so that the wire spring 171 is in engagement with the groove 169, the wheel 134 engages with the wheel 139 and consequently a transfer of 5 units to the accumulator A is effected. In order to secure the wheel 134 against rotation in its position for the time being, instead of a ball 136 on the part 137 a stop spring, not illustrated, may be employed, which directly coacts with the teeth of the wheel 134 in both positions, and thus secures it.

I claim:

1. In a calculating machine, having an an accumulator, amount storing means, a transmission gearing between said accumulator and said amount storing means, movable resetting means for said storing means including an operating member, a manipulative member for coupling said amount storing means with said resetting means, a clutch for operating said resetting means, the combination of a gear drive operable by said operating member to effect a decimal approximation in the desired order of the accumulator when actuating said manipulative member, said gear drive including a gear wheel and a mutilated gear wheel cooperating with the first mentioned gear wheel, a drive member for said mutilated gear wheel actuated by said operating member, and means on said drive member cooperating with the mutilated gear wheel to lock the latter in its rest position and during the first part of movement of the operating member of the resetting means.

2. In a calculating machine, having an accumulator, amount storing means, a transmission gearing between said accumulator and said amount storing means, movable resetting means for said storing means including an operating member, a manipulative member for coupling said amount storing means with said resetting means, and a clutch for operating said resetting means, the combination of a gear drive to effect a decimal approximation in the desired order of the accumulator when actuating said manipulative member, said gear drive including a gear wheel, a mutilated wheel adapted to cooperate with the first mentioned gear wheel, and a drive member for said mutilated wheel slidably connected with and actuated by said operating member.

3. In a calculating machine, having an accumulator, amount storing means, a transmission gearing between said accumulator and said amount storing means, movable resetting means for said storing means including an operating member, a manipulative member for coupling said amount storing means with said resetting means, and a clutch for operating said resetting means, the combination of a gear drive to effect a decimal approximation in the desired order of the accumulator when actuating said manipulative member, said gear drive including a gear wheel, a mutilated wheel adapted to cooperate with the first mentioned gear wheel, and a drive member for said mutilated wheel slidably connected with and actuated by said operating member, and a locking surface on said member coacting with the mutilated part of the mutilated wheel to lock the latter in rest position and during the first part of movement of the resetting means.

4. In a calculating machine, having an accumulator, amount storing means, a transmission gearing between said accumulator and said amount storing means, movable resetting means for said storing means including a rack bar, a manipulative member for coupling said amount storing means with said resetting means, and a clutch for operating said resetting means, the combination of a gear drive to effect a decimal approximation in the desired order of the accumulator when actuating said manipulative member, said gear drive including a gear wheel, a mutilated wheel adapted to cooperate with the first mentioned gear wheel, a rack for driving said mutilated wheel and being slidably connected with and actuated by said rack bar, a locking surface on said rack bar coacting with the mutilated part of the mutilated wheel to lock the latter in rest position and during the first part of movement of the resetting means, certain of the teeth of the rack bar being removed to form a space, the teeth of the driving rack adjacent said space projecting laterally to said rack and occupying said space.

5. In a calculating machine, having an accumulator, amount storing means, a transmission gearing between said accumulator and said amount storing means, movable resetting means for said storing means including a rack bar, a manipulative member for coupling said amount storing means with said resetting means, and a clutch for operating said resetting means, the combination of a gear drive to effect a decimal approximation in the desired order of the accumulator when actuating said manipulative member, said gear drive including a gear wheel, a mutilated wheel adapted to cooperate with the first mentioned gear wheel, a rack for driving said mutilated wheel and being slidably connected with and actuated by said rack bar, a locking surface on said rack bar coacting with the mutilated part of the mutilated wheel to lock the latter in rest position and during the first part of movement of the resetting means, certain of the teeth of the rack bar being removed to form a space, the teeth of the driving rack adjacent said space projecting laterally to said rack and occupying said space, a spring normally retaining the teeth of the driving rack in line with the teeth of the rack bar, and means for limiting the movement of the driving rack.

6. In a calculating machine, having an accumulator, amount storing means, a transmission gearing between said accumulator and said amount storing means, movable resetting means for said storing means including a rack bar, a manipulative member for coupling said amount storing means with said resetting means, and a clutch for operating said resetting means, the combination of a gear drive to effect a decimal approximation in the desired order of the accumulator when actuating said manipulative member, said gear drive including a gear wheel, a multilated wheel adapted to cooperate with the first mentioned gear wheel, a rack for driving said mutilated wheel and being slidably connected with and actuated by said rack bar, a locking surface on said rack bar coacting with the mutilated part of the mutilated wheel to lock the latter in rest position and during the first part of movement of the resetting means, said mutilated wheel having one tooth shortened across its entire width and the two adjacent teeth mutilated and having a zero space opposite said mutilated teeth disposed in the space of the driving rack.

AUGUST FRIEDRICH POTT.